United States Patent
Keshavamurthy et al.

(10) Patent No.: US 12,446,105 B2
(45) Date of Patent: Oct. 14, 2025

(54) METHODS FOR HANDLING SIDELINK MODE-1 GRANT DROP DUE TO MISALIGNMENT WITH SL DRX

(71) Applicant: Nokia Technologies Oy, Espoo (FI)

(72) Inventors: Prajwal Keshavamurthy, Munich (DE); Berthold Panzner, Holzkirchen (DE); Jakob Lindbjerg Buthler, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 433 days.

(21) Appl. No.: 18/164,932

(22) Filed: Feb. 6, 2023

(65) Prior Publication Data

US 2023/0262833 A1 Aug. 17, 2023

Related U.S. Application Data

(60) Provisional application No. 63/309,687, filed on Feb. 14, 2022.

(51) Int. Cl.
*H04W 76/28* (2018.01)
*H04W 72/40* (2023.01)

(52) U.S. Cl.
CPC ........... *H04W 76/28* (2018.02); *H04W 72/40* (2023.01)

(58) Field of Classification Search
CPC ..... H04W 76/28; H04W 72/40; H04W 16/28; H04W 16/00; H04W 16/24; H04W 88/02; H04B 7/15514; H04B 7/14; G01S 13/46; G01S 13/89

See application file for complete search history.

(56) References Cited

U.S. PATENT DOCUMENTS

| | | | | |
|---|---|---|---|---|
| 2021/0251037 A1* | 8/2021 | Akkarakaran | ........ | H04W 76/28 |
| 2022/0132556 A1* | 4/2022 | Alabbasi | ............. | H04W 72/569 |
| 2023/0112798 A1* | 4/2023 | Lee | ........ | H04L 1/0027 |
| | | | | 370/329 |

(Continued)

OTHER PUBLICATIONS

"Report from session on LTE V2X and NR SL", 3GPP TSG-RAN WG2 Meeting #116bis-e electronic, R2-21xxxxx, Agenda: 10.8, Samsung, Jan. 17-25, 2022, pp. 1-11.

(Continued)

*Primary Examiner* — Rushil P. Sampat
(74) *Attorney, Agent, or Firm* — Nokia Technologies Oy

(57) ABSTRACT

A UE may receive a first grant for sidelink transmission; determine that respective inactive states, of one or more target user equipments, at least partially overlap with the first grant for sidelink transmission; determine dropping of the first grant for sidelink transmission; transmit, to a base station, a message regarding dropping of the first grant for sidelink transmission, wherein the message comprises at least one of: an indication of a cause for the dropping of the first grant for sidelink transmission, or an indication of information configured to enable avoidance of dropping of a grant for sidelink transmission; and receive a second grant for sidelink transmission, wherein the second grant for sidelink transmission overlaps with at least one respective active state of the one or more target user equipment, wherein the second grant for sidelink transmission is at least partially different from the first grant for sidelink transmission.

20 Claims, 8 Drawing Sheets

(56) References Cited

U.S. PATENT DOCUMENTS

2024/0040593 A1\* 2/2024 Loehr .................. H04W 76/28

OTHER PUBLICATIONS

"Report from session on LTE V2X and NR SL", 3GPP TSG-RAN WG2 Meeting #116-e electronic, R2-2111298, Agenda: 10.8, Samsung, Nov. 1-12, 2021, pp. 1-27.

"Summary of [POST116-e][716][SL] MAC open issues", 3GPP TSG-RAN WG2 Meeting #116bis electronic, R2-2200051, Agenda: 8.15.2, LG Electronics Inc, Jan. 17-25, 2022, 48 pages.

"3rd Generation Partnership Project; Technical Specification Group Radio Access Network; NR; Radio Resource Control (RRC) protocol specification (Release 16)", 3GPP TS 38.331, V16.7.0, Dec. 2021, pp. 1-963.

"3rd Generation Partnership Project; Technical Specification Group Radio Access Network; NR; Medium Access Control (MAC) protocol specification (Release 16)", 3GPP TS 38.321, V16.7.0, Dec. 2021, pp. 1-158.

"IEEE 802.11p", Wikipedia, Retrieved on Feb. 1, 2023, Webpage available at : https://en.wikipedia.org/wiki/IEEE_802.11p.

\* cited by examiner

700

```
┌─────────────────────────────────┐
│ receive a first grant for sidelink │  710
│ transmission                    │
└─────────────────────────────────┘
              ▼
┌─────────────────────────────────────────────────────┐
│ determine that respective inactive states, of one or more │
│ target user equipments, at least partially overlap with the │
│ first grant for sidelink transmission, wherein the target user │  720
│ equipment is configured to perform sidelink discontinuous │
│ reception                                           │
└─────────────────────────────────────────────────────┘
              ▼
┌─────────────────────────────────────────────────────┐
│ determine dropping of the first grant for sidelink  │
│ transmission based, at least partially, on determining that │  730
│ the respective inactive states at least partially overlap with │
│ the first grant for sidelink transmission           │
└─────────────────────────────────────────────────────┘
              ▼
┌─────────────────────────────────────────────────────┐
│ transmit, to a base station, a message regarding dropping │
│ of the first grant for sidelink transmission, wherein the │
│ message comprises at least one of:                  │
│     an indication of a cause for the dropping of the first │  740
│     grant for sidelink transmission, or             │
│     an indication of information configured to enable │
│     avoidance of dropping of a grant for sidelink   │
│     transmission                                    │
└─────────────────────────────────────────────────────┘
              ▼
┌─────────────────────────────────────────────────────┐
│ receive a second grant for sidelink transmission, wherein │
│ the second grant for sidelink transmission overlaps with at │
│ least one respective active state of the one or more target │
│ user equipment, wherein the second grant for sidelink │  750
│ transmission is at least partially different from the first grant │
│ for sidelink transmission                           │
└─────────────────────────────────────────────────────┘
```

FIG. 7

METHODS FOR HANDLING SIDELINK MODE-1 GRANT DROP DUE TO MISALIGNMENT WITH SL DRX

RELATED APPLICATION

The present application claims priority to and the benefit of U.S. Provisional Application No. 63/309,687, filed Feb. 14, 2022, which is hereby incorporated by reference in its entirety.

TECHNICAL FIELD

The example and non-limiting embodiments relate generally to sidelink communication and, more particularly, to sidelink mode-1 grant drop.

BACKGROUND

It is known, in sidelink communication, for a device to drop a grant in response to misalignment with discontinuous reception active time of a target device.

SUMMARY

The following summary is merely intended to be illustrative. The summary is not intended to limit the scope of the claims.

In accordance with one aspect, an apparatus comprising: at least one processor; and at least one memory including computer program code; the at least one memory and the computer program code configured to, with the at least one processor, cause the apparatus at least to: receive a first grant for sidelink transmission; determine that respective inactive states, of one or more target user equipments, at least partially overlap with the first grant for sidelink transmission, wherein the target user equipment is configured to perform sidelink discontinuous reception; determine dropping of the first grant for sidelink transmission based, at least partially, on determining that the respective inactive states at least partially overlap with the first grant for sidelink transmission; transmit, to a base station, a message regarding dropping of the first grant for sidelink transmission, wherein the message comprises at least one of: an indication of a cause for the dropping of the first grant for sidelink transmission, or an indication of information configured to enable avoidance of dropping of a grant for sidelink transmission; and receive a second grant for sidelink transmission, wherein the second grant for sidelink transmission overlaps with at least one respective active state of the one or more target user equipment, wherein the second grant for sidelink transmission is at least partially different from the first grant for sidelink transmission.

In accordance with one aspect, a method comprising: receiving a first grant for sidelink transmission; determining that respective inactive states, of one or more target user equipments, at least partially overlap with the first grant for sidelink transmission, wherein the target user equipment is configured to perform sidelink discontinuous reception; determining dropping of the first grant for sidelink transmission based, at least partially, on determining that the respective inactive states at least partially overlap with the first grant for sidelink transmission; transmitting, to a base station, a message regarding dropping of the first grant for sidelink transmission, wherein the message comprises at least one of: an indication of a cause for the dropping of the first grant for sidelink transmission, or an indication of information configured to enable avoidance of dropping of a grant for sidelink transmission; and receiving a second grant for sidelink transmission, wherein the second grant for sidelink transmission overlaps with at least one respective active state of the one or more target user equipment, wherein the second grant for sidelink transmission is at least partially different from the first grant for sidelink transmission.

In accordance with one aspect, an apparatus comprising means for performing: receiving a first grant for sidelink transmission; determining that respective inactive states, of one or more target user equipments, at least partially overlap with the first grant for sidelink transmission, wherein the target user equipment is configured to perform sidelink discontinuous reception; determining dropping of the first grant for sidelink transmission based, at least partially, on determining that the respective inactive states at least partially overlap with the first grant for sidelink transmission; transmitting, to a base station, a message regarding dropping of the first grant for sidelink transmission, wherein the message comprises at least one of: an indication of a cause for the dropping of the first grant for sidelink transmission, or an indication of information configured to enable avoidance of dropping of a grant for sidelink transmission; and receiving a second grant for sidelink transmission, wherein the second grant for sidelink transmission overlaps with at least one respective active state of the one or more target user equipment, wherein the second grant for sidelink transmission is at least partially different from the first grant for sidelink transmission.

In accordance with one aspect, a non-transitory computer-readable medium comprising program instructions stored thereon which, when executed with at least one processor, cause the at least one processor to: cause receiving of a first grant for sidelink transmission; determine that respective inactive states, of one or more target user equipments, at least partially overlap with the first grant for sidelink transmission, wherein the target user equipment is configured to perform sidelink discontinuous reception; determine dropping of the first grant for sidelink transmission based, at least partially, on determining that the respective inactive states at least partially overlap with the first grant for sidelink transmission; cause transmitting of, to a base station, a message regarding dropping of the first grant for sidelink transmission, wherein the message comprises at least one of: an indication of a cause for the dropping of the first grant for sidelink transmission, or an indication of information configured to enable avoidance of dropping of a grant for sidelink transmission; and cause receiving of a second grant for sidelink transmission, wherein the second grant for sidelink transmission overlaps with at least one respective active state of the one or more target user equipment, wherein the second grant for sidelink transmission is at least partially different from the first grant for sidelink transmission.

In accordance with one aspect, an apparatus comprising: at least one processor; and at least one memory including computer program code; the at least one memory and the computer program code configured to, with the at least one processor, cause the apparatus at least to: transmit, to a first user equipment, a first grant for sidelink transmission; receive, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and transmit, to the first user equipment, a second grant for sidelink transmission, wherein the second grant for sidelink transmission overlaps with at least one respective active state of the one or more second user equipments, wherein the second grant for sidelink transmission is at least partially different from the first grant for sidelink transmission.

In accordance with one aspect, a method comprising: transmitting, to a first user equipment, a first grant for sidelink transmission; receiving, from the first user equipment, a message regarding dropping of the first grant for sidelink transmission; determining a misalignment between the first grant for sidelink transmission and respective active states of one or more second user equipments based, at least partially, on the received message, wherein the one or more second user equipments are configured to perform sidelink discontinuous reception; and transmitting, to the first user equipment, a second grant for sidelink transmission, wherein the second grant for sidelink transmission overlaps with at least one respective active state of the one or more second user equipments, wherein the second grant for sidelink transmission is at least partially different from the first grant for sidelink transmission.

In accordance with one aspect, an apparatus comprising means for performing: transmitting, to a first user equipment, a first grant for sidelink transmission; receiving, from the first user equipment, a message regarding dropping of the first grant for sidelink transmission; determining a misalignment between the first grant for sidelink transmission and respective active states of one or more second user equipments based, at least partially, on the received message, wherein the one or more second user equipments are configured to perform sidelink discontinuous reception; and transmitting, to the first user equipment, a second grant for sidelink transmission, wherein the second grant for sidelink transmission overlaps with at least one respective active state of the one or more second user equipments, wherein the second grant for sidelink transmission is at least partially different from the first grant for sidelink transmission.

In accordance with one aspect, a non-transitory computer-readable medium comprising program instructions stored thereon which, when executed with at least one processor, cause the at least one processor to: transmit, to a first user equipment, a first grant for sidelink transmission; receive, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and transmit, to the first user equipment, a second grant for sidelink transmission, wherein the second grant for sidelink transmission overlaps with at least one respective active state of the one or more second user equipments, wherein the second grant for sidelink transmission is at least partially different from the first grant for sidelink transmission.

BRIEF DESCRIPTION OF THE DRAWINGS

The foregoing aspects and other features are explained in the following description, taken in connection with the accompanying drawings, wherein:

FIG. 7 is a flowchart illustrating steps as described herein; and

DETAILED DESCRIPTION OF EMBODIMENTS

Figure 1:
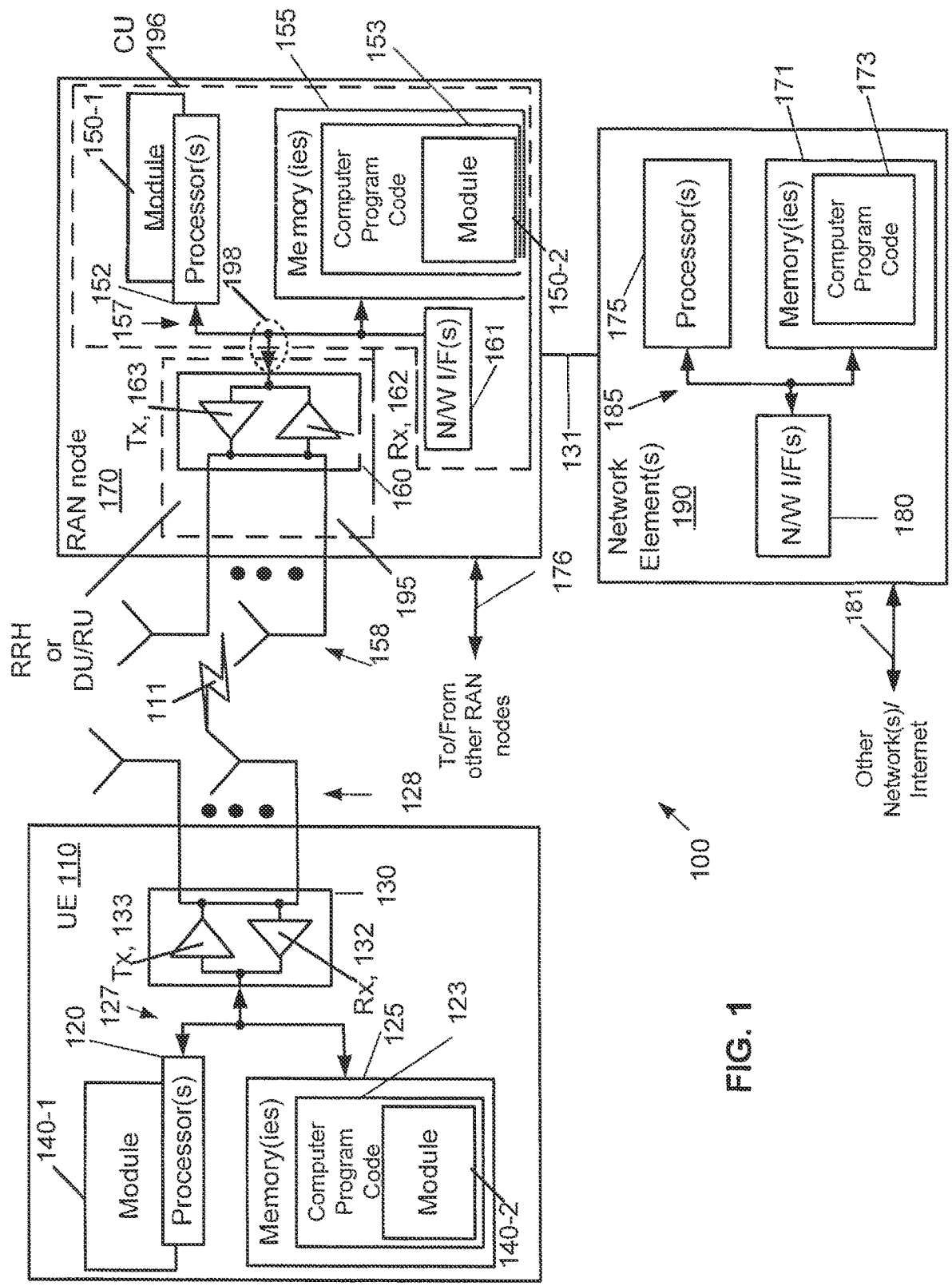
FIG. 1 is a block diagram of one possible and non-limiting example system in which the example embodiments may be practiced.

The following abbreviations that may be found in the specification and/or the drawing figures are defined as follows:

3GPP third generation partnership project
5G fifth generation
5GC 5G core network
ACK acknowledgement
AMF access and mobility management function
AS access stratum
BSR buffer status report
CS configured sidelink
CU central unit
D2D device-to-device
DropSLGrant dropping sidelink grant
DRX discontinuous reception
DU distributed unit
eNB (or eNodeB) evolved Node B (e.g., an LTE base station)
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
HARQ hybrid automatic repeat request
I/F interface
ID identifier
L1 layer 1
L2 layer 2
LTE long term evolution
MAC medium access control
MME mobility management entity
NACK negative/non-acknowledgement
ng or NG new generation
ng-eNB or NG-eNB new generation eNB
NR new radio
NAY or NW network
PDB packet delay budget
PDCCH physical downlink control channel
PDCP packet data convergence protocol
PHY physical layer
ProSe proximity service
PSCCH physical sidelink control channel
PSSCH physical sidelink shared channel
PUCCH physical uplink control channel
QoS quality of service
RAN radio access network RF radio frequency
RLC radio link control
RNTI radio network temporary identifier
RRC radio resource control
RRH remote radio head
RS reference signal
RTT round trip time
RU radio unit
Rx receiver
SCI sidelink control information
SDAP service data adaptation protocol
SGW serving gateway
SL sidelink
SMF session management function
SUI sidelink user equipment information
Tx transmitter
UE user equipment (e.g., a wireless, typically mobile device)
UPF user plane function
V2X vehicle-to-everything
V-RNTI vehicle radio network temporary identifier Turning to FIG. 1, this figure shows a block diagram of one possible and non-limiting example in which the examples may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

Although not illustrated in FIG. 1, the UE 110 may also communicate with other UEs via short range communication technologies, such as, IEEE 802.11p, Bluetooth® etc. If wireless communication with a network is unavailable or not possible, or in addition to network communication, the UE 110 may be capable of sidelink communication with other UEs.

The RAN node 170 in this example is a base station that provides access by wireless devices such as the UE 110 to the wireless network 100. The RAN node 170 may be, for example, a base station for 5G, also called New Radio (NR).

In 5G, the RAN node 170 may be a NG-RAN node, which is defined as either a gNB or a ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a central unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely illustrative functions that may be supported by the network element(s) 190, and note that both 5G and LTE functions might be supported. The RAN node 170 is coupled via a link 131 to a network element 190. The link 131 may be implemented as, e.g., an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions. In addition, various embodiments of the user equipment 110 can include, but are not limited to, devices integrated into vehicles, infrastructure associated with vehicular travel, wearable devices used by pedestrians or other non-vehicular users of roads, user equipment unrelated to traffic users, and user equipment configured to participate in sidelink scenarios, such as public safety user equipment and/or other commercial user equipment.

Features as described herein generally relate to, while not being limited to, new radio (NR)/5G sidelink (SL). For example, NR SL methods may be implemented to provide communication between a vehicle and a network, infrastructure(s), other vehicle(s), or other road user(s) in the surrounding/immediate area. Such communication may enable proximity service (ProSe), or transmission of information about the surrounding environment, between devices in close proximity, for example device-to-device (D2D) communication technology. Such direct communication may be available even when network coverage is unavailable. Additionally or alternatively, NR SL methods may be implemented in scenarios unrelated to traffic users, such as public safety scenarios and/or commercial scenarios. Enhancements to sidelink procedures may be applicable in these vehicle-to-everything (V2X) and other use cases. It should be noted that enhancements to sidelink procedures may not be limited to unicast procedures; a person of ordinary skill in the art would understand that the present disclosure may relate to sidelink groupcast, multicast, and/or broadcast procedures as well.

Features as described herein generally relate to, while not being limited to, mode-1 sidelink grants. Mode-1 sidelink (SL) grants may be provided by a gNodeB (gNB) to a transmitter UE (TX UE) to enable SL data transmission to a discontinuous reception (SL DRX)-enabled receiver UE (RX UE). The SL DRX active time of the RX UE may allow for successful reception at the RX UE, while enabling power saving features.

Sidelink supports timer-based SL DRX for unicast, groupcast, and broadcast. Similar parameters as defined for Uu (e.g. on-duration, inactivity-timer, retransmission-timer, cycle, etc.) are defined for SL DRX, and may be used to determine the SL active time for SL DRX. During the RX UE's SL active time for SL DRX, the RX UE may perform sidelink control information (SCI) monitoring for data reception (i.e., physical sidelink control channel (PSCCH) and 2nd stage SCI multiplexed with physical sidelink shared channel (PSSCH)). The RX UE may skip (i.e. not perform) monitoring of PSCCH and 2nd stage SCI multiplexed with PSSCH for data reception during inactive time for SL DRX; there may not be reception of any data being transmitted to it from another UE that has received a mode-1 SL grant for data transmission. Here, the SL active time of the RX UE may include the time in/during which any of its applicable on-duration timer(s), inactivity-timer(s) or retransmission timer(s) (for any of unicast, groupcast, or broadcast) are running.

In case of unicast, the RX UE may maintain a set of SL DRX timers per pair of source/destination L2 ID and per direction, and may start/restart the timer(s) with the value configured for that pair of source/destination and direction. The DRX configuration between a pair of source/destination L2 IDs for a direction may be negotiated between the TX and RX UEs in the access stratum (AS) layer. For a DRX configuration of each direction, where one UE is the TX UE and the other is the RX UE, a TX-centric approach may be supported, whereby: the RX UE may send assistance information to the TX UE using a PC5-RRC message; and/or the TX UE may send the SL DRX configuration to be used by the RX UE to the RX UE using a RRCReconfigurationSidelink message.

When the TX UE is in-coverage and in an RRC_CONNECTED state, the TX UE may report the received assistance information to its serving gNB and may obtain the SL DRX configuration to send to the RX UE in/via dedicated RRC signaling from the network (e.g. serving gNB).

When the RX UE is in-coverage and in an RRC_CONNECTED state, the RX UE may report the received SL DRX configuration to its serving gNB.

On-duration timer(s), inactivity-timer(s), hybrid automatic repeat request retransmission timer(s) (HARQ RTT), and/or (SL) retransmission timer(s) may be supported in unicast. SL HARQ RTT timer(s) and SL retransmission timer(s) may be maintained per SL HARQ process at the RX UE. The TX UE may maintain a timer, corresponding to the SL inactivity timer in the RX UE, for each pair of source/destination L2 ID, and may use the timer(s) as part of the criterion for determining an allowable transmission time for the RX UE (i.e. when transmission to the RX UE may be successful).

For groupcast/broadcast, SL DRX may be configured commonly among multiple UEs based on quality of service (QoS) profile and L2 ID. On-duration timer(s), inactivity-timer(s), HARQ RTT, and/or retransmission timer(s) may be supported for groupcast. On-duration timer(s) may be supported for broadcast. SL HARQ RTT timer(s) and SL retransmission timer(s) may be maintained per SL HARQ process at the RX UE. The TX UE may maintain a timer corresponding to the SL inactivity timer in the RX UE for each pair of source/destination L2 ID, and may use the timer(s) as part of the criterion for determining an allowable time for transmission to the RX UE (i.e. when transmission to the RX UE may be successful).

Figure 2:
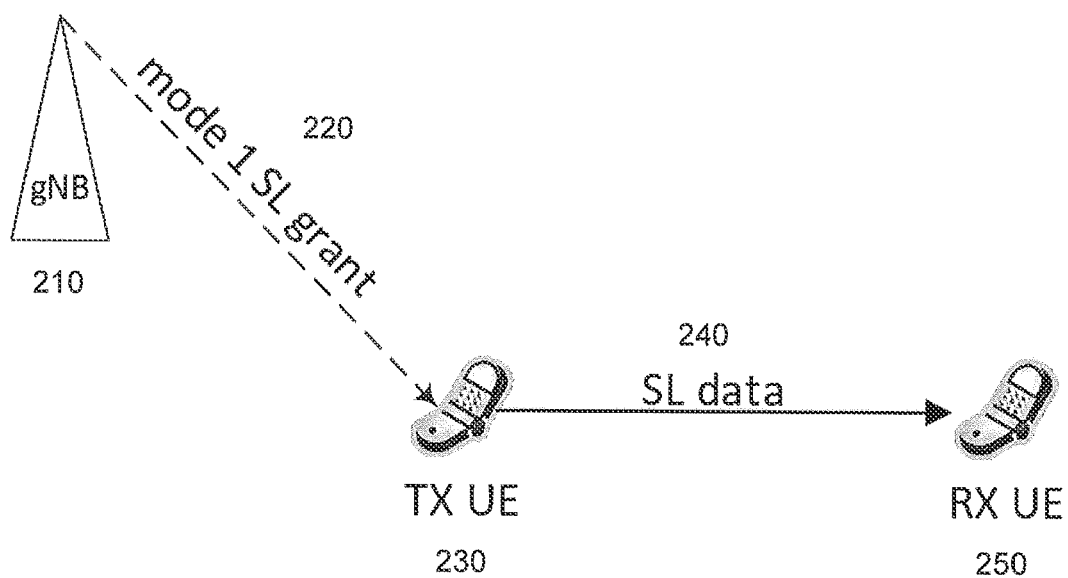
FIG. 2 is a diagram illustrating features as described herein.

Referring now to FIG. 2, illustrated is an example of NR SL mode-1 resource allocation. The gNB (210) may dynamically allocate resources to the TX UE (230) via the sidelink radio network temporary identifier (SL-RNTI) on physical downlink control channel (PDCCH) for NR sidelink communication. In addition, the gNB (210) may allocate sidelink resources to the TX UE (230) with two types of configured sidelink grants. With type 1 configured sidelink grants, a radio resource control (RRC) message/signal may directly provide the configured sidelink grant (220) only for NR sidelink communication. With type 2 configured sidelink grants, a RRC message/signal may define the periodicity of the configured sidelink grant (220), while a PDCCH message/signal may be used to either signal and activate the configured sidelink grant, or deactivate it. The PDCCH message/signal may be addressed to a SL-CS-RNTI for NR sidelink communication. Using the mode 1 SL grant (220), the TX UE (230) may transmit SL data (240) to an RX UE (250).

Additionally or alternatively, the gNB (210) may also semi-persistently allocate sidelink resources to the TX UE (230) via the SL Semi-Persistent Scheduling vehicle radio network temporary identifier (V-RNTI) using PDCCH message(s)/signal(s) for V2X sidelink communication.

In an example NR SL mode-1 resource allocation (network-scheduled SL transmission) scenario for a TX-RX pair of SL DRX configured UEs, as illustrated in FIG. 2, the TX UE (230) may expect a mode-1 SL grant (220) from the gNB (210) for its SL data transmission (240) to the RX UE (250). As noted above, a SL DRX-configured RX UE may perform SCI monitoring and, consequently, data reception during its SL active time, and may skip monitoring of SCI, and, consequently, data reception, during inactive time. Therefore, a mode-1 SL grant (220) provided by the gNB (210) to TX UE (230) (for transmission (240) to RX UE (250)) must be (at least partially) in synchronization with the SL active time of the RX UE (250) in order to allow for successful SL data reception at the RX UE (250). When the mode-1 SL grant (220) is not in synchronization with the active time of the RX UE (250), the TX UE (230) may drop the grant.

In the present disclosure, the terms "not in synchronization," "mismatch," and "misalignment" may all be used to indicate that the mode-1 SL grant of the TX UE does not at least partially overlap with the DRX active time of the RX UE to which the TX UE has data to transmit via sidelink communication. In the present disclosure, these terms are considered to be interchangeable.

In the present disclosure, a single TX UE and a single RX UE are frequently discussed for the sake of clarity. However, this is not a limitation on example embodiments of the present disclosure; multiple TX UE and/or multiple RX UE may be involved.

It may be noted that misalignment between the mode-1 SL grant of the TX UE and the active time of the RX UE configured with SL DRX may be due to: a scheduling error by the gNB (e.g. erroneous gNB sidelink resource allocation); invalid SL DRX configuration information of the RX UE available at the TX UE (e.g. erroneous SL DRX UE synchronization at TX UE); and/or the gNB not being informed about a SL DRX reconfiguration/update by a TX UE (e.g. shortening the active time). Misalignment may be caused by one or more errors.

Where the misalignment between provided SL grant and RX UE active time is the result of a scheduling error by the gNB, the error originates at the gNB. Where the misalignment between provided SL grant and RX UE active time is the result of invalid SL DRX configuration information of the RX UE available at the TX UE, or the gNB not being informed about a SL DRX reconfiguration, the error originates at the TX UE.

When the mode-1 grant for a SL transmission does not overlap with the active time of the RX UE, and the mode-1 grant is dropped, it is undefined what feedback/information (e.g. ACK, NACK) may be provided/reported to the gNB regarding the SL transmission for which the mode 1 SL grant was intended (e.g. through the PUCCH, if configured).

In an example, when ACK is reported, the gNB may assume that the corresponding SL transmission to the RX UE was successful. Consequently, the gNB may continue to schedule the SL grant in the 'active time' assumed by the gNB. However, these grants would be dropped, since they are actually not in the active time of the RX UE. Hence, the TX UE may not get a valid SL grant for its transmission to the RX UE, which may result in poor reliability (and significantly increased latency). Furthermore, the RX UE's active time may be extended by inactivity timer(s) (even though the mode-1 SL grant may be dropped at the TX UE), which may increase the power consumption at the RX UE.

In an example, when NACK is reported, the gNB may assume that the corresponding SL transmission to the RX UE was unsuccessful. Consequently, the gNB may schedule a grant to the TX UE for retransmission to the RX UE. However, the new grant may also not be in alignment with the active time of the RX UE, and hence may be dropped by the TX UE. In other words, the gNB may not be able to ensure/guarantee that the new grant is aligned with the active time of the RX UE. Therefore, reporting NACK to the gNB may also result in poor reliability and increased power consumption, as described above for the case of ACK. Also, it may result in an additional issue, due to not toggling the New Data Indicator (especially for dropped grants).

Example embodiments of the present disclosure may provide a mechanism that has the technical effect of enabling the gNB to align the mode-1 SL grant with the DRX active time of RX UE to improve SL reliability, latency, and RX UE's power consumption performances.

A technical effect of example embodiments of the present disclosure may be to resolve the issue where sidelink grants are dropped by the TX UE due to SL DRX conflicts (i.e. the grant is not within the active time for any destinations of the TX UE). It may be noted that, in a case of unicast, there may only be one destination for the TX UE. In a case of groupcast or broadcast, there may be one or more destinations for the TX UE.

In an example embodiment, when the TX UE detects a grant being dropped due to no destinations being in the SL active time, the TX UE may report/transmit, to the gNB, at least one of: a NACK, a new message, and/or an ACK. The transmission from the TX UE to the gNB may include the reason/cause for the dropped grant and/or a proposed resolution/solution to the error. In an example embodiment, the reason/cause for the dropped grant and/or a proposed resolution/solution to the error may be indicated together with a single indication. In an example embodiment, the reason/cause for the dropped grant may be an indication/information of what caused the grant to be dropped by the TX UE. In an example embodiment, the proposed resolution/solution may be an indication/information configured to enable avoidance of future grant drop. Additionally or alternatively, the proposed resolution/solution may be information to assist in resolving the drop grant issue.

The reason/resolution may comprise an indication of whether the grant is dropped due to SL DRX conflict, or another reason(s). Additionally or alternatively, the reason/resolution may comprise other means of utilizing TX UE-to-gNB feedback to indicate reason/resolution. Additionally or alternatively, the reason/resolution may comprise an indication of when the active time is expected to next occur.

In an example embodiment, a method and message for the gNB to request an update of the active time, upon certain events being triggered, may be implemented. The event triggering the request for the update may comprise an indication received from the TX UE. Additionally or alternatively, the event triggering the request for the update may involve an internal gNB implementation which, for example, reacts to consecutive NACKs from the TX UE, for example for a periodic time.

Figure 3:
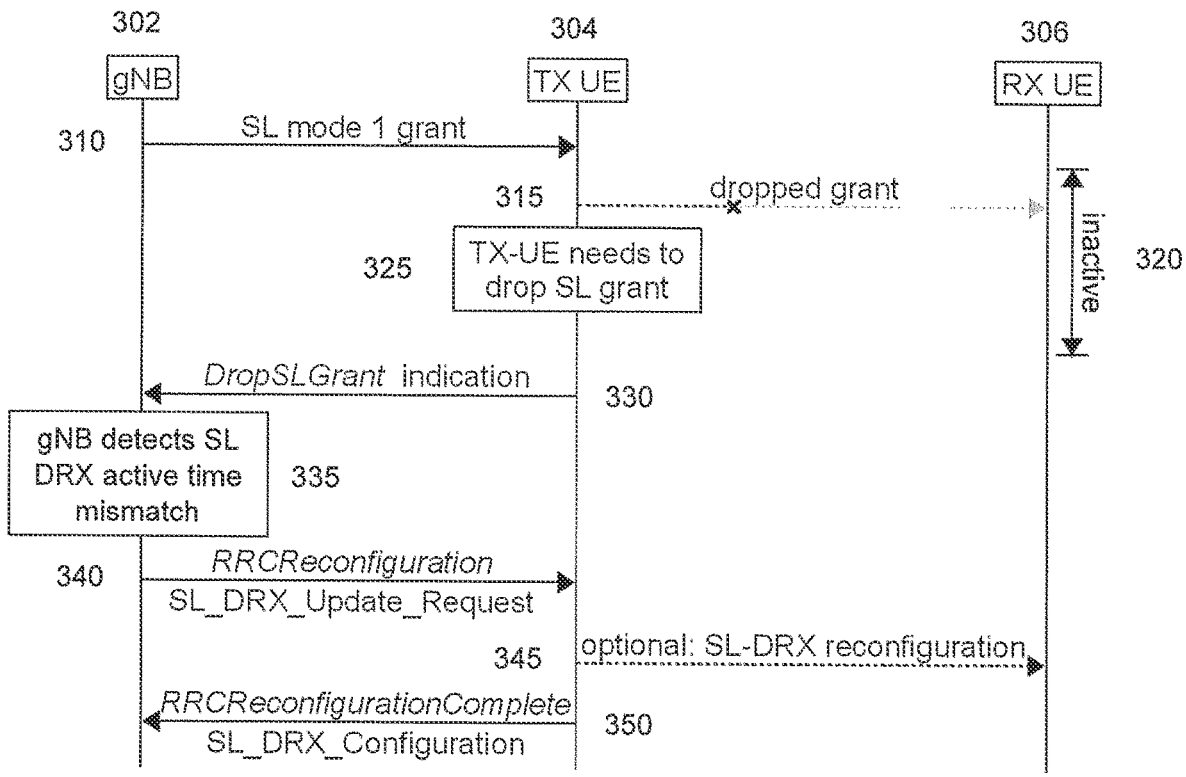
FIG. 3 is a diagram illustrating features as described herein.

Based on gNB detection of SL DRX active time mismatch, for example according to an example embodiment described herein, the gNB may request an update of the SL DRX configuration from the TX UE, which may respond with the current configuration(s) of SL DRX active time(s). Referring now to FIG. 3, illustrated is an example of detection of SL DRX active time mismatch. At 310, the gNB 302 may transmit a SL mode-1 grant to a TX UE 304 configured to perform SL communication. At 315, the TX UE 304 may consider whether to attempt sidelink communication with RX UE 306, according to the SL mode-1 grant. However, the RX UE 306 may be inactive (320) at the time TX UE 304 receives the SL mode-1 grant, 315. In other words, the TX UE 304 may determine that, if a data transmission were made according to the SL mode-1 grant, the transmission would not be received by the RX UE 306. This may be due to a mismatch between the SL mode-1 grant and the active time of the RX UE 306. As a result of the mismatch, the grant may be dropped, 315, as illustrated by the dotted line, ending in an arrow, that fades to gray, indicating that the data would not be received by the RX UE 306, and so is not transmitted by TX UE 304 to RX UE 306.

It may be noted that FIG. 3 may illustrate a scenario in which the TX UE 304 has data to be transmitted via sidelink unicast, as the TX UE 304 may drop the grant if it at overlaps with the inactive time of RX UE 306. In another example, TX UE 304 might only drop the grant if it is determined that the grant overlaps with the inactive time of all RX UE to which it has data to transmit via sidelink communication.

It may also be noted that, in an example the TX UE 304 may drop the grant even if the grant only partially overlaps with the inactive time of one or more target RX UE. For example if the grant spans multiple slots, the TX UE 304 may drop the grant if the beginning portion of the grant overlaps with the end part of inactive time of one or more target RX UE.

At 325, the TX UE 304 may determine that the TX UE 304 needs to drop the SL grant, for example due to the mismatch/dropped grant. At 330, the TX UE 304 may transmit, to the gNB 302, a DropSLGrant indication. At 335, the gNB 302 may detect the SL DRX active time mismatch, for example based on the DropSLGrant indication. At 340, the gNB 302 may transmit, to the TX UE 304, an RRCReconfiguation message. The RRCReconfiguration message may include SL_DRX_Update_Request. At optional step 345, the TX UE 304 may transmit, to RX UE 306, a SL DRX reconfiguration. At 350, the TX UE 304 may transmit, to the gNB 302, an RRCReconfigurationComplete message. The RRCReconfigurationComplete message may include SL_DRX_Configuration.

In an example embodiment, upon dropping a mode-1 SL grant received from a gNB for a SL transmission to a SL DRX-enabled RX UE (e.g. at 315), a TX UE may provide a (novel) indication to the gNB through PUCCH on the dropping SL grant (DropSLGrant) event (e.g. at 330), alongside with the reason why the SL grant had to be dropped, and avoidance of future DropSLGrant events, wherein the DropSLGrant event may refer to any event that results in dropping at least one mode-1 SL grant at the TX UE.

In an example embodiment, utilizing the novel indication for SL scheduling, the gNB may avoid further DropSLGrant events at the TX UE (e.g. at 340).

Figure 4:
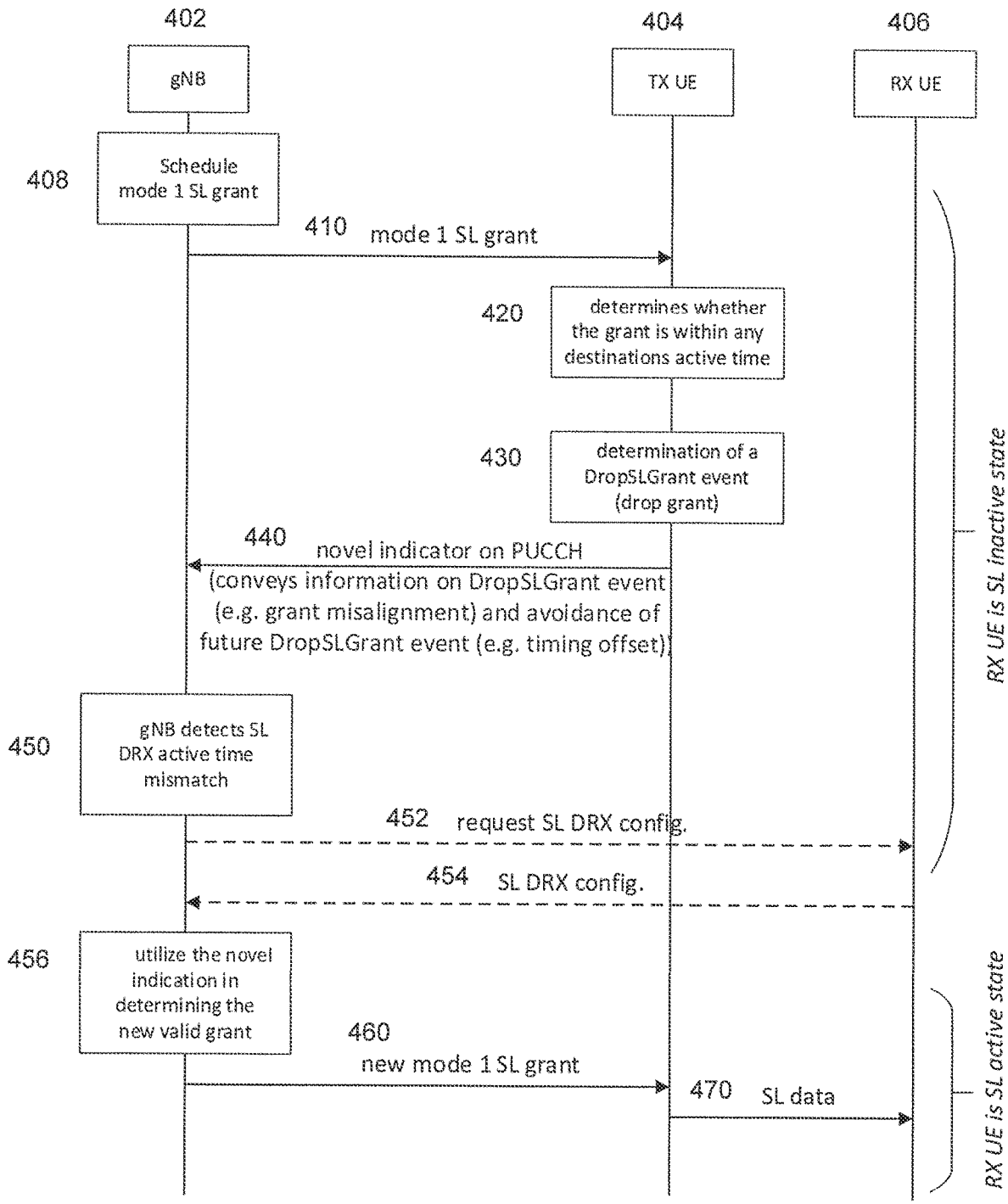
FIG. 4 is a diagram illustrating features as described herein.

Referring now to FIG. 4, illustrated is an example of detecting a SL DRX active time mismatch, in which the gNB 402 may, optionally, request the DRX configuration information of the RX UE 406 from the RX UE 406. At 408, the gNB 402 may schedule a mode-1 SL grant for the TX UE 404. At 410, the TX UE 404 may receive a mode-1 SL grant from the gNB 402 for its SL transmission to the SL DRX-enabled RX UE 406. At 420, the Tx UE 404 may determine whether the grant is within any destination's (e.g. one or more intended RX UE) active time.

At 430, if the grant is not within any destination's active time, the TX UE 404 may determine whether or not a DropSLGrant event has occurred for the received mode-1 SL grant, i.e. whether the TX UE 404 is not able to utilize the grant for any transmission(s). Any event that results in dropping at least one mode-1 SL grant at the TX UE may be referred to as a DropSLGrant event. Examples of a DropSLGrant event include:

DropSLGrant event type-1: Dropping of mode-1 SL grant, as it does not overlap with the active time of the RX UE;

DropSLGrant event type-2: Dropping of mode-1 SL grant due to other higher priority transmission at the TX UE (e.g. Uu transmission) which does not allow for the corresponding SL transmission to occur simultaneously (due to, e.g., hardware limitations).

At 440, upon determination of a DropSLGrant event (430), the TX UE 404 may provide a novel indication/indicator to the gNB, for example through PUCCH, on the DropSLGrant event and a proposed resolution for avoidance of future DropSLGrant event(s). The DropSLGrant event may be considered an indication of grant misalignment. The proposed resolution for avoidance of future DropSLGrant event(s) may, for example, be a timing offset. In an example, the timing offset may be determined by the TX UE 404 based on information regarding the SL DRX configuration of the RX UE 406.

In an example embodiment, feedback sequences transmitted on PUCCH may be used as the novel indicator to indicate information on the DropSLGrant event and proposed resolution for avoidance of future DropSLGrant event(s).

In an example embodiment, the timing offset range(s) (e.g. with respect to the dropped grant) may be implicitly mapped to feedback sequence(s). By sending a mapped/corresponding sequence via the novel indicator, the timing offset may be conveyed to the gNB 402. This may have the technical effect of allowing for the gNB 402 to adapt and align its next sidelink grant(s) with the active time of RX UE 406 (e.g. by applying the reported timing offset while scheduling the grant).

In an example embodiment, a trigger to wait, and receive additional information on the DropSLGrant event and a proposed resolution for avoidance of future DropSLGrant event(s) by means of different Uu signaling (e.g. sidelink UE information (SUI), SL buffer status report (BSR), etc.), may be mapped to feedback sequence(s). In other words, a feedback sequence may be mapped to a Uu signaling. By sending a corresponding feedback sequence via the novel indicator, the gNB may be triggered to wait and receive the additional information by means of the mapped/corresponding Uu signaling. As a result, the gNB 402 may wait to receive, for example, updated DRX active time information of the RX UE 406 from the TX UE 404 in, for example, SUI, and may schedule the next grant(s) by aligning with the updated active time. This may have the technical effect of allowing the gNB 402 to avoid scheduling new grants which may be discarded at the TX UE 404.

In an example embodiment, a type of the DropSLGrant event (e.g. reason for dropping grant) may be mapped to feedback sequence(s). By sending a mapped/corresponding sequence via the novel indicator, the type of DropSLGrant event may be conveyed to the gNB 402. This may have the technical effect of enabling the gNB 402 to identify not only that the grant is dropped, but also whether or not it might consider adapting its SL grant(s) scheduling in response.

In an example embodiment, ranges of remaining packet delay budget (PDB) at the TX UE 404 may be mapped to feedback sequence(s). By sending a mapped/corresponding sequence via the novel indicator, the remaining PDB may be conveyed to the gNB 402. This may allow the gNB 402 to schedule a new grant within the PDB; this may have the technical effect of avoiding impact to SL reliability.

In an example embodiment, the novel indicator may be generated by combining the aforementioned embodiments to convey more information on the DropSLGrant event and avoidance of future DropSLGrant events. For example, both a feedback sequence configured to indicate a type of the DropSLGrant event and a feedback sequence configured to trigger the gNB to wait to receive additional information via a mapped signaling may be indicated via the novel indicator. A person of ordinary skill in the art may understand other combinations of information that may be conveyed via the novel indicator.

At 450, the gNB 402 may detect the SL DRX active time mismatch. In an example embodiment, upon receiving the novel indicator, the gNB 402 may use 456 the indicated information on the DropSLGrant event and proposed resolution for avoidance of future DropSLGrant event(s) transmitted by the TX UE 404, for example to determine a new (valid) grant for the TX UE 404. This may have the technical effect of enabling avoidance of further DropSLGrant events at the TX UE 404.

It may be noted that, when the mode-1 SL grant does not overlap with the DRX active time of RX UE 406, the misalignment may be due to a scheduling error by the gNB 402, or may result from the invalid SL DRX configuration information of the RX UE 406 available at the gNB 402 (i.e. non-synchronicity at the TX UE 404 about RX UE 406 active/inactive time). In an example embodiment, the gNB behavior 456 in response to detection of SL DRX active time mismatch may depend, at least partially, on the type of error that caused the misalignment.

In an example where the error that causes the DropSLGrant event at the TX UE 404 is a scheduling error at the gNB 402, when timing offset information is available at the gNB 402, the gNB 402 may apply the offset in generating the new mode-1 SL grant (while scheduling), 456. This may have the technical effect of enabling the new/next grant to be aligned with active time of the RX UE 406.

In an example where the error that causes the DropSLGrant event at the TX UE 404 is a scheduling error at the gNB 402, when the gNB 402 is triggered to wait and receive the additional information by means of a specific Uu signaling (e.g. SUI), the gNB 402 may wait (and, if needed, may schedule for the Uu signaling) and receive the additional information on the DropSLGrant event and proposed resolution for avoidance of future DropSLGrant event(s). For example, the additional information may include an updated active time of RX UE 406. This may have the technical effect of enabling the gNB 402 to avoid scheduling new grants which may be discarded at the TX UE 404.

In an example where the error that causes the DropSLGrant event at the TX UE 404 is a scheduling error at the gNB 402, when the type of DropSLGrant event is known at the gNB 402, the gNB 402 may identify whether or not it must adapt its SL grant(s) scheduling, and may perform further action(s) to receive updated and/or additional information from the TX UE 404.

Figure 5:
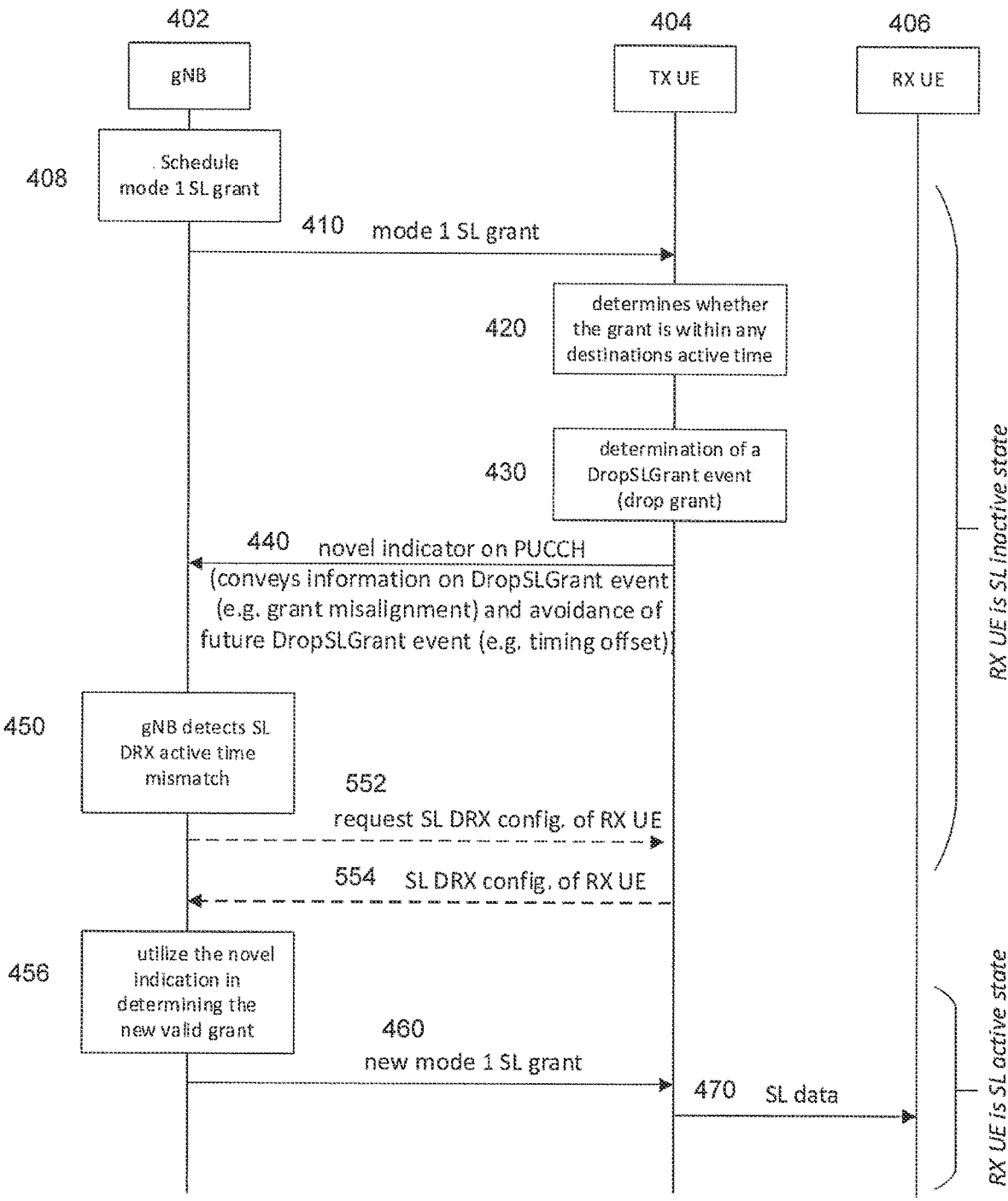
FIG. 5 is a diagram illustrating features as described herein.

In an example embodiment, in a case of frequent DropSLGrant event type-1 reports, the gNB 402 may optionally request that the TX UE 404 report RX UE's DRX configuration so that it can align the future grants with active time of the RX UE 406. Referring now to FIG. 5, illustrated is an example of detecting a SL DRX active time mismatch, in which the gNB 402 may, optionally, request 552 and receive 554 SL DRX configuration of the RX UE 406 and align the mode-1 SL grant with active time of RX UE, 456. The same labels are used in FIG. 5 as in FIG. 4 to indicate overlap between the depicted message sequences; for the sake of conciseness, repetitive description is omitted.

In an example where the error that causes the DropSLGrant event at the TX UE 404 is a scheduling error at the gNB 402, when the remaining PDB information is available at the gNB 402, the gNB 402 may schedule the new grant within the PDB, 456, which may have the technical effect of ensuring that the SL reliability is not impacted.

Figure 6:
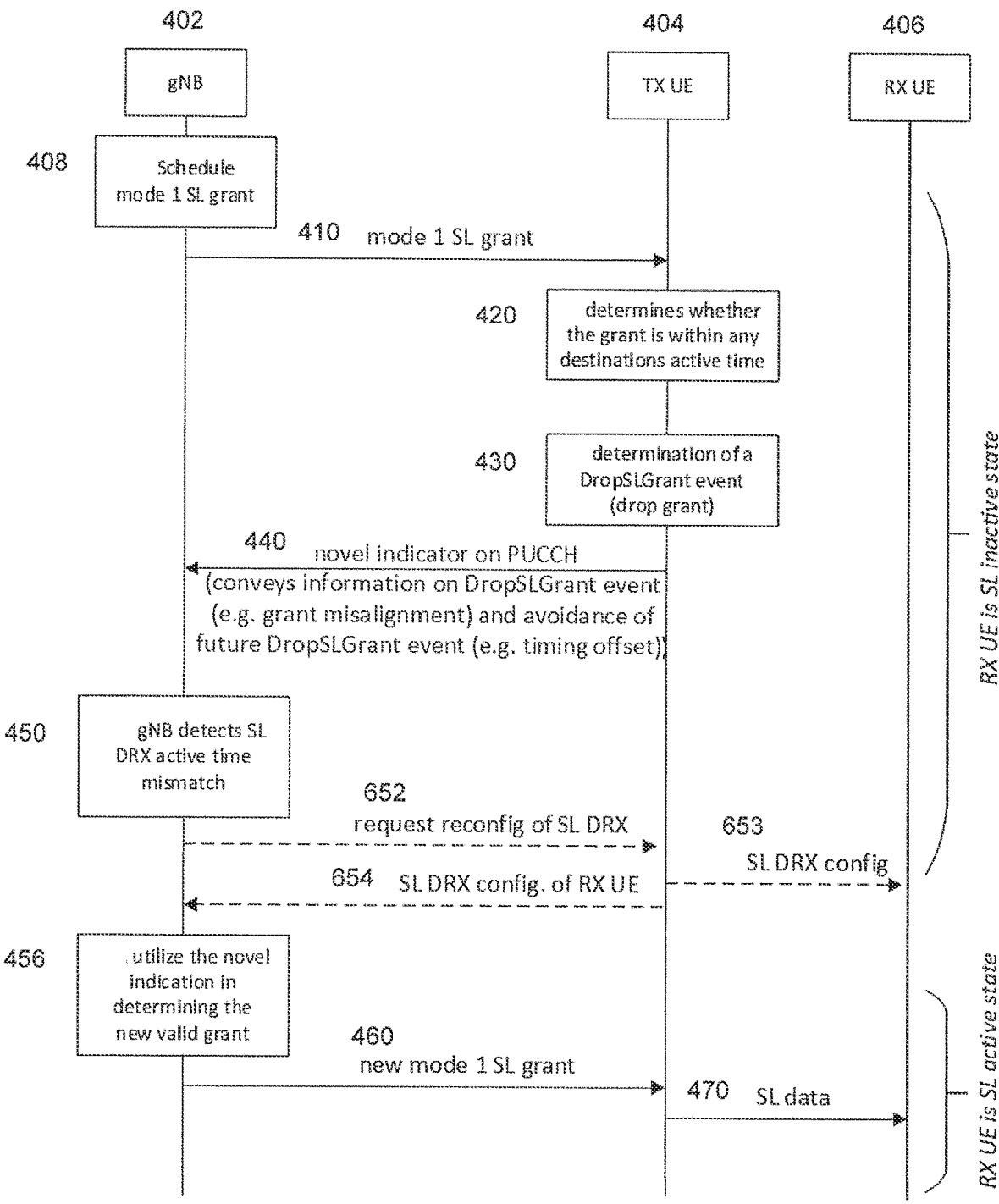
FIG. 6 is a diagram illustrating features as described herein.

In an example where the error that causes the DropSLGrant event at the TX UE 404 is an error at TX UE 404, upon receiving the novel indicator (in case of mode-1 SL grant misalignment, i.e. DropSLGrant event type-1), the gNB 402 may, optionally, request (452) and receive (454) the DRX configuration information (e.g. active time information) of the RX UE 406 from the RX UE 406, either directly via Uu link, or indirectly via the TX UE 404 using SL relaying. Also, the gNB 402 may trigger the TX UE 404 to reconfigure SL DRX between the TX UE 404 and RX UE 406. Referring now to FIG. 6, illustrated is an example of detecting a SL DRX active time mismatch, in which the gNB 402 may, optionally, request 652 that the TX UE 404 reconfigure SL DRX of RX UE 406. At 653, the TX UE 404 may, optionally, indicate the updated SL DRX configuration to the RX UE 406, and may, optionally, receive the updated SL DRX configuration of the RX UE 406. At 654, the TX U3 404 may, optionally, indicate to the gNB 402 the SL DRX configuration of the RX UE 406. Then, the gNB 402 may align the mode-1 SL grant with active time of RX UE 406, 456. The same labels are used in FIG. 6 as in FIGS. 4 and 5 to indicate overlap between the depicted message sequences; for the sake of conciseness, repetitive description is omitted.

In an example where the error that causes the DropSLGrant event at the TX UE 404 is an error at TX UE 404, in case of frequent NACKs after performing mode-1 SL grant alignment upon previously receiving a novel indicator, the gNB 402 may, optionally, request 452 that the RX UE 406 report its corresponding SL DRX configuration so that it can align the future grants with active time of the RX UE 406, 456. Hence, a technical effect may be that any error in perceived active time of RX UE 406 at the TX UE 404 (which it may have reported to gNB 402 before) does not influence the mode-1 SL grant scheduling at the gNB 402, 456.

In an example where the error that causes the DropSLGrant event at the TX UE 404 is an error at TX UE 404, upon receiving the novel indicator (for DropSLGrant event type-1), if there are other TX UE transmitting to the Rx UE 406 (of interest), the gNB 402 may check if the mode-1 SL grant is in active time of the RX UE 406. If not, the gNB 402 may align its grant based on the active time indicated by the other TX UE, 456.

After determining the new valid grant, at 460 the gNB 402 may provide, to TX UE 404, the new/next mode-1 SL grant in active time of the RX UE 406. At 470, the TX UE 404 may transmit SL data to the RX UE 406 using the new mode-1 SL grant and during the DRX active time of the RX UE 406.

In an example embodiment, the mode-1 sidelink grant of a UE (e.g. TX UE) may be aligned with the SL DRX active time of another UE (e.g. one or more RX UEs) to which the UE with the grant (e.g. TX UE) wants to transmit, so at to allow for successful reception of the transmitted data.

In an example embodiment, a TX UE, upon determining that a mode-1 sidelink grant has been dropped, may provide an indication of the dropping of the grant, via the PUCCH, to the gNB. In an example embodiment, the indication may be in the form of an ACK, a NACK, or a new defined message, which may also provide feedback, including the reason for the dropping of the grant (e.g. due to SL DRX conflict) and when the active time will occur next. In an example embodiment, once the gNB receives this information, it may detect a SL DRX mismatch and in turn request the SL DRX configuration of the TX UE (or in some cases the SL DRX configuration of the RX UE) in order to determine and issue a new grant (to the TX UE) that may be aligned with the RX UE SL DRX configuration.

In an example embodiment, the gNB may request the SL DRX configuration of the TX UE (or in some cases the SL DRX configuration of the RX UE), so that the then-issued grant is aligned with the SL DRX of the RX UE.

A technical effect of example embodiments of the present disclosure may be to align mode-1 SL grant with the DRX active time of the RX UE for improved SL reliability, latency and RX UE's power consumption performance. A technical effect of example embodiments of the present disclosure may be to enables a gNB to align mode-1 SL grant with the DRX active time of an RX UE.

A technical effect of example embodiments of the present disclosure may be to improve SL resource utilization, as the dropping of mode-1 SL grant may be minimized. A technical effect of example embodiments of the present disclosure may be to improve SL reliability (and latency performance), since the packet delivery within the PDB may be ensured. A technical effect of example embodiments of the present disclosure may be to reduce power consumption at RX UE, as example embodiments may have the technical effect of avoiding unnecessary extension of active time which otherwise may occur when the mode-1 SL grant is dropped.

FIG. 7 illustrates the potential steps of an example method 700. The example method 700 may include: receiving a first grant for sidelink transmission, 710; determining that respective inactive states, of one or more target user equipments, at least partially overlap with the first grant for sidelink transmission, wherein the target user equipment is configured to perform sidelink discontinuous reception, 720; determining dropping of the first grant for sidelink transmission based, at least partially, on determining that the respective inactive states at least partially overlap with the first grant for sidelink transmission, 730; transmitting, to a base station, a message regarding dropping of the first grant for sidelink transmission, wherein the message comprises at least one of: an indication of a cause for the dropping of the first grant for sidelink transmission, or an indication of information configured to enable avoidance of dropping of a grant for sidelink transmission, 740; and receiving a second grant for sidelink transmission, wherein the second grant for sidelink transmission overlaps with at least one respective active state of the one or more target user equipment, wherein the second grant for sidelink transmission is at least partially different from the first grant for sidelink transmission, 750.

Figure 8:
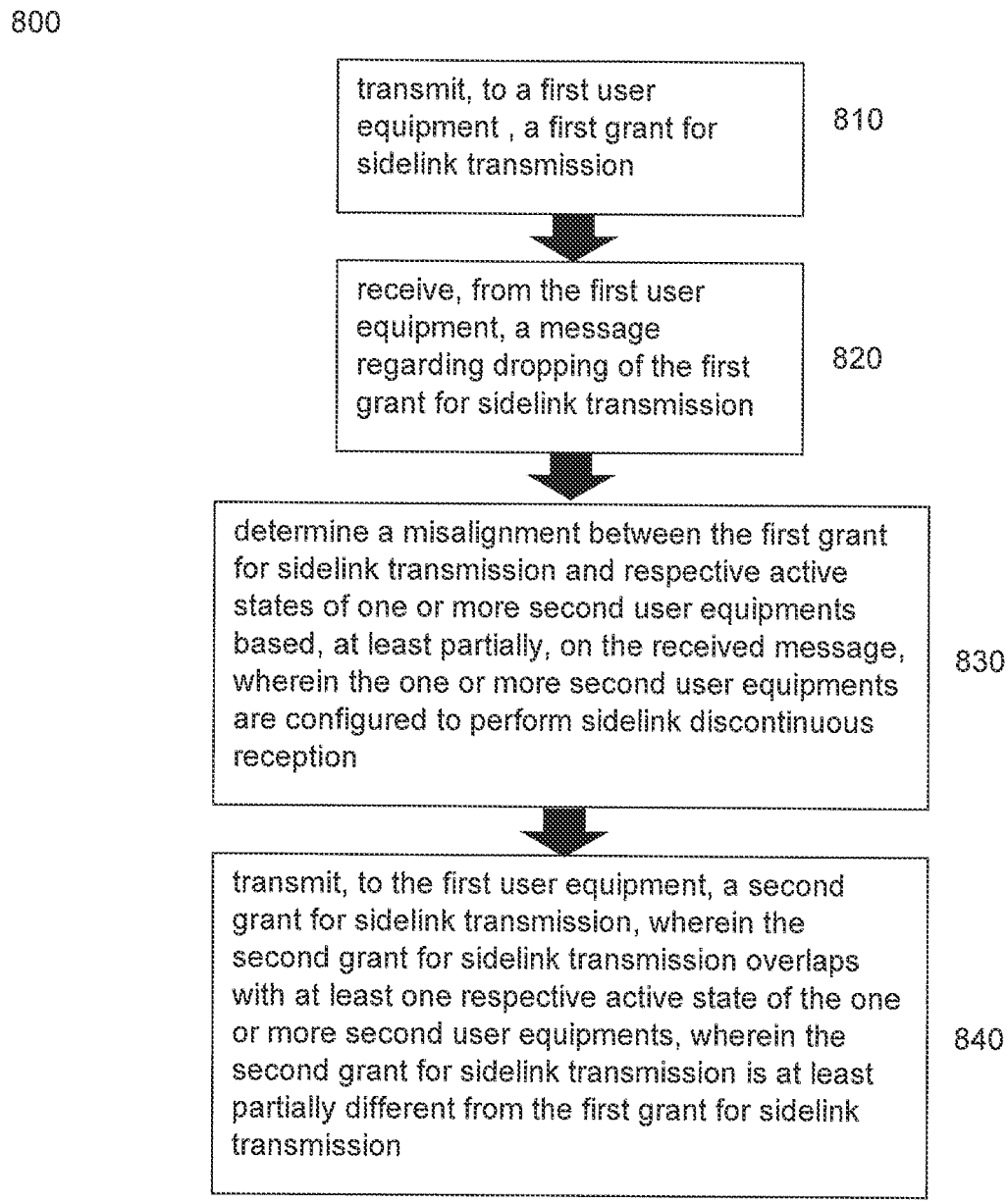
FIG. 8 is a flowchart illustrating steps as described herein.

FIG. 8 illustrates the potential steps of an example method 800. The example method 800 may include: transmitting, to a first user equipment, a first grant for sidelink transmission, 810; receiving, from the first user equipment, a message regarding dropping of the first grant for sidelink transmission, 820; determining a misalignment between the first grant for sidelink transmission and respective active states of one or more second user equipments based, at least partially, on the received message, wherein the one or more second user equipments are configured to perform sidelink discontinuous reception, 830; and transmitting, to the first user equipment, a second grant for sidelink transmission, wherein the second grant for sidelink transmission overlaps with at least one respective active state of the one or more second user equipments, wherein the second grant for sidelink transmission is at least partially different from the first grant for sidelink transmission, 840.

In accordance with one example embodiment, an apparatus may comprise: at least one processor; and at least one memory including computer program code; the at least one memory and the computer program code configured to, with the at least one processor, cause the apparatus at least to: receive a first grant for sidelink transmission; determine that respective inactive states, of one or more target user equipments, at least partially overlap with the first grant for sidelink transmission, wherein the target user equipment may be configured to perform sidelink discontinuous reception; determine dropping of the first grant for sidelink transmission based, at least partially, on determining that the respective inactive states at least partially overlap with the first grant for sidelink transmission; transmit, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission; and receive a second grant for sidelink transmission, wherein the second grant for sidelink transmission overlaps with at least one respective active state of the one or more target user equipment, wherein the second grant for sidelink transmission may be at least partially different from the first grant for sidelink transmission.

The example apparatus may be further configured to: determine the cause for the dropping of the first grant for sidelink transmission based on at least one of: a misalignment between respective active states of the one or more target user equipments and the first grant for sidelink transmission, one or more transmissions with a higher priority than a transmission to the one or more target user equipments, wherein the one or more transmissions conflict with the transmission to the one or more target user equipments, respective sidelink discontinuous reception configurations associated with the one or more target user equipments, or at least one timer associated with the respective inactive states of the one or more target user equipments.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more target user equipments, wherein the one or more transmissions conflict with the transmission to the one or more target user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more target user equipments, a feedback sequence mapped to a timing offset range associated with the at least one respective active state of the one or more target user equipments, a feedback sequence mapped to a range of a remaining packet delay budget, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more target user equipment.

The message regarding the dropping of the first grant for sidelink transmission may comprise one of: acknowledgement feedback, negative acknowledgement feedback, or a different sequence of feedback transmitted via a physical uplink control channel.

The example apparatus may be further configured to: transmit, to at least one of the one or more target user equipments, a sidelink discontinuous reception configuration.

The example apparatus may be further configured to: receive, from the base station, a request to reconfigure sidelink discontinuous reception between the apparatus and at least one of the one or more target user equipments.

The example apparatus may be further configured to: reconfigure the sidelink discontinuous reception between the apparatus and the at least one target user equipment; and transmit, to the base station, an indication of a reconfigured sidelink discontinuous reception configuration of the at least one target user equipment.

In accordance with one aspect, an example method may be provided comprising: receiving a first grant for sidelink transmission; determining that respective inactive states, of one or more target user equipments, at least partially overlap with the first grant for sidelink transmission, wherein the target user equipment may be configured to perform sidelink discontinuous reception; determining dropping of the first grant for sidelink transmission based, at least partially, on determining that the respective inactive states at least partially overlap with the first grant for sidelink transmission; transmitting, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission;

and receiving a second grant for sidelink transmission, wherein the second grant for sidelink transmission overlaps with at least one respective active state of the one or more target user equipment, wherein the second grant for sidelink transmission may be at least partially different from the first grant for sidelink transmission.

The example method may further comprise: determining the cause for the dropping of the first grant for sidelink transmission based on at least one of: a misalignment between respective active states of the one or more target user equipments and the first grant for sidelink transmission, one or more transmissions with a higher priority than a transmission to the one or more target user equipments, wherein the one or more transmissions conflict with the transmission to the one or more target user equipments, respective sidelink discontinuous reception configurations associated with the one or more target user equipments, or at least one timer associated with the respective inactive states of the one or more target user equipments.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more target user equipments, wherein the one or more transmissions conflict with the transmission to the one or more target user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more target user equipments, a feedback sequence mapped to a timing offset range associated with the at least one respective active state of the one or more target user equipments, a feedback sequence mapped to a range of a remaining packet delay budget, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more target user equipment.

The message regarding the dropping of the first grant for sidelink transmission may comprise one of: acknowledgement feedback, negative acknowledgement feedback, or a different sequence of feedback transmitted via a physical uplink control channel.

The example method may further comprise: transmitting, to at least one of the one or more target user equipments, a sidelink discontinuous reception configuration.

The example method may further comprise: receiving, from the base station, a request to reconfigure sidelink discontinuous reception between a transmitting user equipment and at least one of the one or more target user equipments.

The example method may further comprise: reconfiguring the sidelink discontinuous reception between the transmitting user equipment and the at least one target user equipment; and transmitting, to the base station, an indication of a reconfigured sidelink discontinuous reception configuration of the at least one target user equipment.

In accordance with one example embodiment, an apparatus may comprise: circuitry configured to perform: receive a first grant for sidelink transmission; determine that respective inactive states, of one or more target user equipments, at least partially overlap with the first grant for sidelink transmission, wherein the target user equipment may be configured to perform sidelink discontinuous reception; determine dropping of the first grant for sidelink transmission based, at least partially, on determining that the respective inactive states at least partially overlap with the first grant for sidelink transmission; transmit, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission; and receive a second grant for sidelink transmission, wherein the second grant for sidelink transmission overlaps with at least one respective active state of the one or more target user equipment, wherein the second grant for sidelink transmission may be at least partially different from the first grant for sidelink transmission.

In accordance with one example embodiment, an apparatus may comprise: processing circuitry; memory circuitry including computer program code, the memory circuitry and the computer program code configured to, with the processing circuitry, enable the apparatus to: receive a first grant for sidelink transmission; determine that respective inactive states, of one or more target user equipments, at least partially overlap with the first grant for sidelink transmission, wherein the target user equipment may be configured to perform sidelink discontinuous reception; determine dropping of the first grant for sidelink transmission based, at least partially, on determining that the respective inactive states at least partially overlap with the first grant for sidelink transmission; transmit, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission; and receive a second grant for sidelink transmission, wherein the second grant for sidelink transmission overlaps with at least one respective active state of the one or more target user equipment, wherein the second grant for sidelink transmission may be at least partially different from the first grant for sidelink transmission.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In accordance with one example embodiment, an apparatus may comprise means for performing: receiving a first grant for sidelink transmission; determining that respective inactive states, of one or more target user equipments, at least partially overlap with the first grant for sidelink transmission, wherein the target user equipment may be configured to perform sidelink discontinuous reception; determining dropping of the first grant for sidelink transmission based, at least partially, on determining that the respective inactive states at least partially overlap with the first grant for sidelink transmission; transmitting, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission; and receiving a second grant for sidelink transmission, wherein the second grant for sidelink transmission overlaps with at least one respective active state of the one or more target user equipment, wherein the second grant for sidelink transmission may be at least partially different from the first grant for sidelink transmission.

The means may be further configured to perform: determining the cause for the dropping of the first grant for sidelink transmission based on at least one of: a misalignment between respective active states of the one or more target user equipments and the first grant for sidelink transmission, one or more transmissions with a higher priority than a transmission to the one or more target user equipments, wherein the one or more transmissions conflict with the transmission to the one or more target user equipments, respective sidelink discontinuous reception configurations associated with the one or more target user equipments, or at least one timer associated with the respective inactive states of the one or more target user equipments.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more target user equipments, wherein the one or more transmissions conflict with the transmission to the one or more target user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more target user equipments, a feedback sequence mapped to a timing offset range associated with the at least one respective active state of the one or more target user equipments, a feedback sequence mapped to a range of a remaining packet delay budget, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more target user equipment.

The message regarding the dropping of the first grant for sidelink transmission may comprise one of: acknowledgement feedback, negative acknowledgement feedback, or a different sequence of feedback transmitted via a physical uplink control channel.

The means may be further configured to perform: transmitting, to at least one of the one or more target user equipments, a sidelink discontinuous reception configuration.

The means may be further configured to perform: receiving, from the base station, a request to reconfigure sidelink discontinuous reception between the apparatus and at least one of the one or more target user equipments.

The means may be further configured to perform: reconfiguring the sidelink discontinuous reception between the apparatus and the at least one target user equipment; and transmitting, to the base station, an indication of a reconfigured sidelink discontinuous reception configuration of the at least one target user equipment.

In accordance with one example embodiment, a non-transitory computer-readable medium comprising program instructions stored thereon which, when executed with at least one processor, cause the at least one processor to: cause receiving of a first grant for sidelink transmission; determine that respective inactive states, of one or more target user equipments, at least partially overlap with the first grant for sidelink transmission, wherein the target user equipment may be configured to perform sidelink discontinuous reception; determine dropping of the first grant for sidelink transmission based, at least partially, on determining that the respective inactive states at least partially overlap with the first grant for sidelink transmission; cause transmitting of, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission; and cause receiving of a second grant for sidelink transmission, wherein the second grant for sidelink transmission overlaps with at least one respective active state of the one or more target user equipment, wherein the second grant for sidelink transmission may be at least partially different from the first grant for sidelink transmission.

The example non-transitory computer-readable medium may be further configured to: determine the cause for the dropping of the first grant for sidelink transmission based on at least one of: a misalignment between respective active states of the one or more target user equipments and the first grant for sidelink transmission, one or more transmissions with a higher priority than a transmission to the one or more target user equipments, wherein the one or more transmissions conflict with the transmission to the one or more target user equipments, respective sidelink discontinuous reception configurations associated with the one or more target user equipments, or at least one timer associated with the respective inactive states of the one or more target user equipments.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more target user equipments, wherein the one or more transmissions conflict with the transmission to the one or more target user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more target user equipments, a feedback sequence mapped to a timing offset range associated with the at least one respective active state of the one or more target user equipments, a feedback sequence mapped to a range of a remaining packet delay budget, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more target user equipment.

The message regarding the dropping of the first grant for sidelink transmission may comprise one of: acknowledgement feedback, negative acknowledgement feedback, or a different sequence of feedback transmitted via a physical uplink control channel.

The example non-transitory computer-readable medium may be further configured to: cause transmitting of, to at least one of the one or more target user equipments, a sidelink discontinuous reception configuration.

The example non-transitory computer-readable medium may be further configured to: receive, from the base station, a request to reconfigure sidelink discontinuous reception between a transmitting user equipment and at least one of the one or more target user equipments.

The example non-transitory computer-readable medium may be further configured to: reconfigure the sidelink discontinuous reception between the transmitting user equipment and the at least one target user equipment; and cause transmitting of, to the base station, an indication of a reconfigured sidelink discontinuous reception configuration of the at least one target user equipment.

In accordance with another example embodiment, a non-transitory program storage device readable by a machine may be provided, tangibly embodying a program of instructions executable by the machine for performing operations, the operations comprising: cause receiving of a first grant for sidelink transmission; determine that respective inactive states, of one or more target user equipments, at least partially overlap with the first grant for sidelink transmission, wherein the target user equipment is configured to perform sidelink discontinuous reception; determine dropping of the first grant for sidelink transmission based, at least partially, on determining that the respective inactive states at least partially overlap with the first grant for sidelink transmission; cause transmitting of, to a base station, a message regarding dropping of the first grant for sidelink transmission, wherein the message may comprise at least one of: an indication of a cause for the dropping of the first grant for sidelink transmission, or an indication of information configured to enable avoidance of dropping of a grant for sidelink transmission; and cause receiving of a second grant for sidelink transmission, wherein the second grant for sidelink transmission overlaps with at least one respective active state of the one or more target user equipment, wherein the second grant for sidelink transmission may be at least partially different from the first grant for sidelink transmission.

In accordance with one example embodiment, an apparatus may comprise: at least one processor; and at least one memory including computer program code; the at least one memory and the computer program code configured to, with the at least one processor, cause the apparatus at least to: transmit, to a first user equipment, a first grant for sidelink transmission; receive, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and transmit, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

The example apparatus may be further configured to: determine that the misalignment may be based on at least one of: an error in sidelink resource allocation, an error in information, at the first user equipment, regarding at least one respective sidelink discontinuous reception configuration of the one or more second user equipments, or an update of the at least one respective sidelink discontinuous reception configuration of the one or more second user equipments not received by the apparatus.

The misalignment may be determined to be based, at least, on one of: the error in the sidelink resource allocation, or the update of the at least one respective sidelink discontinuous reception configuration of the one or more second user equipments not received by the apparatus, wherein the example apparatus may be further configured to: at least one of: determine the second grant for sidelink transmission based on available timing offset information associated with the at least one respective sidelink discontinuous reception configuration of the one or more second user equipments, determine the second grant for sidelink transmission based on additional information regarding the first grant for sidelink transmission received after the message, request that the first user equipment report a respective sidelink discontinuous reception configuration of the one or more second user equipments and determine the second grant for sidelink transmission based on the reported respective sidelink discontinuous reception configuration of the one or more second user equipments, or determine the second grant for sidelink transmission based on packet delay budget information.

The misalignment may be determined to be based, at least, on one of: the error in the information, at the first user equipment, regarding the at least one respective sidelink discontinuous reception configuration of the one or more second user equipments, or the update of the at least one respective sidelink discontinuous reception configuration of the one or more second user equipments not received by the apparatus, wherein the example apparatus may be further configured to: request discontinuous reception configuration information of at least one of the one or more second user equipments, from one of the first user equipment or the at least one second user equipment; and determine the second grant for sidelink transmission based on the requested discontinuous reception configuration information of the at least one second user equipment.

The example apparatus may be further configured to: transmit, to the first user equipment, a request to reconfigure sidelink discontinuous reception between the first user equipment and at least one of the one or more second user equipment.

The message regarding the first grant for sidelink transmission may comprise at least one of: an indication of a cause for dropping of the first grant for sidelink transmission, or an indication of information configured to enable avoidance of dropping of a grant for sidelink transmission.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more second user equipments, wherein the one or more transmissions conflict with the transmission to the one or more second user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more second user equipments, a feedback sequence mapped to a timing offset range associated with at least one of the respective active states of the one or more second user equipments, a feedback sequence mapped to a range of a remaining packet delay budget of the first user equipment, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more second user equipments, wherein the example apparatus may be further configured to: wait for the additional information based, at least partially, on the indication to wait for the additional information.

The example apparatus may be further configured to: request an update regarding the at least one of the respective active states of the one or more second user equipments based on at least one of: receipt of the message, or a determination that a predetermined number of negative acknowledgements have been received from the first user equipment during a predefined time period.

The example apparatus may be further configured to: determine that there is not misalignment between respective grants for sidelink transmission for one or more third user equipments and the one or more second user equipments; and determine the second grant for sidelink transmission based, at least partially, on the determination that there is not misalignment between the respective grants for sidelink transmission for the one or more third user equipments and the one or more second user equipments.

In accordance with one aspect, an example method may be provided comprising: transmitting, to a first user equipment, a first grant for sidelink transmission; receiving, from the first user equipment, a message regarding dropping of the first grant for sidelink transmission; determining a misalignment between the first grant for sidelink transmission and respective active states of one or more second user equipments based, at least partially, on the received message, wherein the one or more second user equipments are configured to perform sidelink discontinuous reception; and transmitting, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

The example method may further comprise: determining that the misalignment is based on at least one of: an error in sidelink resource allocation, an error in information, at the first user equipment, regarding at least one respective sidelink discontinuous reception configuration of the one or more second user equipments, or an update of the at least one respective sidelink discontinuous reception configuration of the one or more second user equipments not received by a base station.

The misalignment may be determined to be based, at least, on one of: the error in the sidelink resource allocation, or the update of the at least one respective sidelink discontinuous reception configuration of the one or more second user equipments not received by the base station, wherein the example method may further comprise: at least one of: determining the second grant for sidelink transmission based on available timing offset information associated with the at least one respective sidelink discontinuous reception configuration of the one or more second user equipments, determining the second grant for sidelink transmission based on additional information regarding the first grant for sidelink transmission received after the message, requesting that the first user equipment report a respective sidelink discontinuous reception configuration of the one or more second user equipments and determining the second grant for sidelink transmission based on the reported respective sidelink discontinuous reception configuration of the one or more second user equipments, or determining the second grant for sidelink transmission based on packet delay budget information.

The misalignment may be determined to be based, at least, on one of: the error in the information, at the first user equipment, regarding the at least one respective sidelink discontinuous reception configuration of the one or more second user equipments, or the update of the at least one respective sidelink discontinuous reception configuration of the one or more second user equipments not received by the base station, wherein the example method may further comprise: requesting discontinuous reception configuration information of at least one of the one or more second user equipments, from one of the first user equipment or the at least one second user equipment; and determining the second grant for sidelink transmission based on the requested discontinuous reception configuration information of the at least one second user equipment.

The example method may further comprise: transmitting, to the first user equipment, a request to reconfigure sidelink discontinuous reception between the first user equipment and at least one of the one or more second user equipment.

The message regarding the first grant for sidelink transmission may comprise at least one of: an indication of a cause for dropping of the first grant for sidelink transmission, or an indication of information configured to enable avoidance of dropping of a grant for sidelink transmission.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more second user equipments, wherein the one or more transmissions conflict with the transmission to the one or more second user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more second user equipments, a feedback sequence mapped to a timing offset range associated with at least one of the respective active states of the one or more second user equipments, a feedback sequence mapped to a range of a remaining packet delay budget of the first user equipment, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more second user equipments, wherein the example method may further comprise: waiting for the additional information based, at least partially, on the indication to wait for the additional information.

The example method may further comprise: requesting an update regarding the at least one of the respective active states of the one or more second user equipments based on at least one of: receipt of the message, or a determination that a predetermined number of negative acknowledgements have been received from the first user equipment during a predefined time period.

The example method may further comprise: determining that there is not misalignment between respective grants for sidelink transmission for one or more third user equipments and the one or more second user equipments; and determining the second grant for sidelink transmission based, at least partially, on the determination that there is not misalignment between the respective grants for sidelink transmission for the one or more third user equipments and the one or more second user equipments.

In accordance with one example embodiment, an apparatus may comprise: circuitry configured to perform: transmit, to a first user equipment, a first grant for sidelink transmission; receive, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and transmit, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

In accordance with one example embodiment, an apparatus may comprise: processing circuitry; memory circuitry including computer program code, the memory circuitry and the computer program code configured to, with the processing circuitry, enable the apparatus to: transmit, to a first user equipment, a first grant for sidelink transmission; receive, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and transmit, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

In accordance with one example embodiment, an apparatus may comprise means for performing: transmitting, to a first user equipment, a first grant for sidelink transmission; receiving, from the first user equipment, a message regarding dropping of the first grant for sidelink transmission; determining a misalignment between the first grant for sidelink transmission and respective active states of one or more second user equipments based, at least partially, on the received message, wherein the one or more second user equipments are configured to perform sidelink discontinuous reception; and transmitting, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

The means may be further configured to perform: determining that the misalignment may be based on at least one of: an error in sidelink resource allocation, an error in information, at the first user equipment, regarding at least one respective sidelink discontinuous reception configuration of the one or more second user equipments, or an update of the at least one respective sidelink discontinuous reception configuration of the one or more second user equipments not received by the apparatus.

The misalignment may be determined to be based, at least, on one of: the error in the sidelink resource allocation, or the update of the at least one respective sidelink discontinuous reception configuration of the one or more second user equipments not received by the apparatus, wherein the means may be further configured to perform: at least one of: determining the second grant for sidelink transmission based on available timing offset information associated with the at least one respective sidelink discontinuous reception configuration of the one or more second user equipments, determining the second grant for sidelink transmission based on additional information regarding the first grant for sidelink transmission received after the message, requesting that the first user equipment report a respective sidelink discontinuous reception configuration of the one or more second user equipments and determining the second grant for sidelink transmission based on the reported respective sidelink discontinuous reception configuration of the one or more second user equipments, or determining the second grant for sidelink transmission based on packet delay budget information.

The misalignment may be determined to be based, at least, on one of: the error in the information, at the first user equipment, regarding the at least one respective sidelink discontinuous reception configuration of the one or more second user equipments, or the update of the at least one respective sidelink discontinuous reception configuration of the one or more second user equipments not received by the apparatus, wherein the means may be further configured to perform: requesting discontinuous reception configuration information of at least one of the one or more second user equipments, from one of the first user equipment or the at least one second user equipment; and determining the second grant for sidelink transmission based on the requested discontinuous reception configuration information of the at least one second user equipment.

The means may be further configured to perform: transmitting, to the first user equipment, a request to reconfigure sidelink discontinuous reception between the first user equipment and at least one of the one or more second user equipment.

The message regarding the first grant for sidelink transmission may comprise at least one of: an indication of a cause for dropping of the first grant for sidelink transmission, or an indication of information configured to enable avoidance of dropping of a grant for sidelink transmission.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more second user equipments, wherein the one or more transmissions conflict with the transmission to the one or more second user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more second user equipments, a feedback sequence mapped to a timing offset range associated with at least one of the respective active states of the one or more second user equipments, a feedback sequence mapped to a range of a remaining packet delay budget of the first user equipment, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more second user equipments, wherein the means may be further configured to perform: waiting for the additional information based, at least partially, on the indication to wait for the additional information.

The means may be further configured to perform: requesting an update regarding the at least one of the respective active states of the one or more second user equipments based on at least one of: receipt of the message, or a determination that a predetermined number of negative acknowledgements have been received from the first user equipment during a predefined time period.

The means may be further configured to perform: determining that there is not misalignment between respective grants for sidelink transmission for one or more third user equipments and the one or more second user equipments; and determining the second grant for sidelink transmission based, at least partially, on the determination that there is not misalignment between the respective grants for sidelink transmission for the one or more third user equipments and the one or more second user equipments.

In accordance with one example embodiment, a non-transitory computer-readable medium comprising program instructions stored thereon which, when executed with at least one processor, cause the at least one processor to: cause transmitting, to a first user equipment, a first grant for sidelink transmission; cause receiving, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and cause transmitting, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

The example non-transitory computer-readable medium may be further configured to: determine that the misalignment is based on at least one of: an error in sidelink resource allocation, an error in information, at the first user equipment, regarding at least one respective sidelink discontinuous reception configuration of the one or more second user equipments, or an update of the at least one respective sidelink discontinuous reception configuration of the one or more second user equipments not received by a base station.

The misalignment may be determined to be based, at least, on one of: the error in the sidelink resource allocation, or the update of the at least one respective sidelink discontinuous reception configuration of the one or more second user equipments not received by the base station, wherein the example non-transitory computer-readable medium may be further configured to: at least one of: determine the second grant for sidelink transmission based on available timing offset information associated with the at least one respective sidelink discontinuous reception configuration of the one or more second user equipments, determine the second grant for sidelink transmission based on additional information regarding the first grant for sidelink transmission received after the message, cause requesting that the first user equipment report a respective sidelink discontinuous reception configuration of the one or more second user equipments and determine the second grant for sidelink transmission based on the reported respective sidelink discontinuous reception configuration of the one or more second user equipments, or determine the second grant for sidelink transmission based on packet delay budget information.

The misalignment may be determined to be based, at least, on one of: the error in the information, at the first user equipment, regarding the at least one respective sidelink discontinuous reception configuration of the one or more second user equipments, or the update of the at least one respective sidelink discontinuous reception configuration of the one or more second user equipments not received by the base station, wherein the example non-transitory computer-readable medium may be further configured to: cause requesting of discontinuous reception configuration information of at least one of the one or more second user equipments, from one of the first user equipment or the at least one second user equipment; and determine the second grant for sidelink transmission based on the requested discontinuous reception configuration information of the at least one second user equipment.

The example non-transitory computer-readable medium may be further configured to: cause transmitting of, to the first user equipment, a request to reconfigure sidelink discontinuous reception between the first user equipment and at least one of the one or more second user equipment.

The message regarding the first grant for sidelink transmission may comprise at least one of: an indication of a cause for dropping of the first grant for sidelink transmission, or an indication of information configured to enable avoidance of dropping of a grant for sidelink transmission.

The indication of the cause for the dropping of the first grant for sidelink transmission may comprise one or more of: an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more second user equipments, wherein the one or more transmissions conflict with the transmission to the one or more second user equipments, or a feedback sequence mapped to a type of the cause for the dropping of the first grant for sidelink transmission.

The information configured to enable avoidance of dropping of the grant for sidelink transmission may comprise one or more of: an indication of one or more next active states of the one or more second user equipments, a feedback sequence mapped to a timing offset range associated with at least one of the respective active states of the one or more second user equipments, a feedback sequence mapped to a range of a remaining packet delay budget of the first user equipment, or a feedback sequence mapped to an indication to wait for additional information to be received via a first signaling.

The first signaling may comprise one of: a sidelink buffer status report, or a sidelink user equipment information report, wherein the additional information to be received via the first signaling may comprise an indication of at least one respective updated discontinuation reception active state information of the one or more second user equipments, wherein the example non-transitory computer-readable medium may be further configured to: cause waiting for the additional information based, at least partially, on the indication to wait for the additional information.

The example non-transitory computer-readable medium may be further configured to: cause requesting of an update regarding the at least one of the respective active states of the one or more second user equipments based on at least one of: receipt of the message, or a determination that a predetermined number of negative acknowledgements have been received from the first user equipment during a predefined time period.

The example non-transitory computer-readable medium may be further configured to: determine that there is not misalignment between respective grants for sidelink transmission for one or more third user equipments and the one or more second user equipments; and determine the second grant for sidelink transmission based, at least partially, on the determination that there is not misalignment between the respective grants for sidelink transmission for the one or more third user equipments and the one or more second user equipments.

In accordance with another example embodiment, a non-transitory program storage device readable by a machine may be provided, tangibly embodying a program of instructions executable by the machine for performing operations, the operations comprising: cause transmitting, to a first user equipment, a first grant for sidelink transmission; cause receiving, from the first user equipment, a message regarding dropping of the first grant for sidelink transmission; determine a misalignment between the first grant for sidelink transmission and respective active states of one or more second user equipments based, at least partially, on the received message, wherein the one or more second user equipments are configured to perform sidelink discontinuous reception; and cause transmitting, to the first user equipment, a second grant for sidelink transmission, wherein the second grant for sidelink transmission overlaps with at least one respective active state of the one or more second user equipments, wherein the second grant for sidelink transmission may be at least partially different from the first grant for sidelink transmission.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modification and variances which fall within the scope of the appended claims.

The invention claimed is:

1. An apparatus comprising:
at least one processor; and
at least one non-transitory memory including computer program code;
the at least one memory and the computer program code configured to, with the at least one processor, cause the apparatus at least to:
receive a first grant for sidelink transmission;
determine that respective inactive states, of one or more target user equipments, at least partially overlap with the first grant for sidelink transmission, wherein the target user equipment is configured to perform sidelink discontinuous reception;
determine dropping of the first grant for sidelink transmission based, at least partially, on determining that the respective inactive states at least partially overlap with the first grant for sidelink transmission;
transmit, to a base station, a message regarding dropping of the first grant for sidelink transmission, wherein the message comprises at least one of:
an indication of a cause for the dropping of the first grant for sidelink transmission, or
an indication of information configured to enable avoidance of dropping of a grant for sidelink transmission; and
receive a second grant for sidelink transmission, wherein the second grant for sidelink transmission overlaps with at least one respective active state of the one or more target user equipment, wherein the second grant for sidelink transmission is at least partially different from the first grant for sidelink transmission.

2. The apparatus of claim 1, wherein the at least one memory and the computer program code are configured to, with the at least one processor, cause the apparatus to:
determine the cause for the dropping of the first grant for sidelink transmission based on at least one of:
a misalignment between respective active states of the one or more target user equipments and the first grant for sidelink transmission, one or more transmissions with a higher priority than a transmission to the one or more target user equipments, wherein the one or more transmissions conflict with the transmission to the one or more target user equipments,
respective sidelink discontinuous reception configurations associated with the one or more target user equipments, or
at least one timer associated with the respective inactive states of the one or more target user equipments.

3. The apparatus of claim 1, wherein the indication of the cause for the dropping of the first grant for sidelink transmission comprises one or more of:
an indication of whether the dropping of the first grant for sidelink transmission is due to a sidelink discontinuous reception conflict,
an indication of whether the dropping of the first grant for sidelink transmission is due to one or more transmissions with a higher priority than a transmission to the one or more target user equipments, wherein the one or more transmissions conflict with the transmission to the one or more target user equipments, or
a feedback sequence mapped to a type of the cause for the dropping of the first grant for sidelink transmission.

4. The apparatus of claim 1, wherein the information configured to enable avoidance of dropping of the grant for sidelink transmission comprises one or more of:
an indication of one or more next active states of the one or more target user equipments,
a feedback sequence mapped to a timing offset range associated with the at least one respective active state of the one or more target user equipments,
a feedback sequence mapped to a range of a remaining packet delay budget, or
a feedback sequence mapped to an indication to wait for additional information to be received via a first signaling.

5. The apparatus of claim 4, wherein the first signaling comprises one of:
a sidelink buffer status report, or
a sidelink user equipment information report,
wherein the additional information to be received via the first signaling comprises an indication of at least one respective updated discontinuation reception active state information of the one or more target user equipment.

6. The apparatus of claim 1, wherein the message regarding the dropping of the first grant for sidelink transmission comprises one of:
acknowledgement feedback,
negative acknowledgement feedback, or
a different sequence of feedback transmitted via a physical uplink control channel.

7. The apparatus of claim 1, wherein the at least one memory and the computer program code are configured to, with the at least one processor, cause the apparatus to:
transmit, to at least one of the one or more target user equipments, a sidelink discontinuous reception configuration.

8. The apparatus of claim 1, wherein the at least one memory and the computer program code are configured to, with the at least one processor, cause the apparatus to:
receive, from the base station, a request to reconfigure sidelink discontinuous reception between the apparatus and at least one of the one or more target user equipments.

9. The apparatus of claim 8, wherein the at least one memory and the computer program code are configured to, with the at least one processor, cause the apparatus to:
reconfigure the sidelink discontinuous reception between the apparatus and the at least one target user equipment; and
transmit, to the base station, an indication of a reconfigured sidelink discontinuous reception configuration of the at least one target user equipment.

10. An apparatus comprising:
at least one processor; and
at least one non-transitory memory including computer program code;
the at least one memory and the computer program code configured to, with the at least one processor, cause the apparatus at least to:
transmit, to a first user equipment, a first grant for sidelink transmission;
receive, from the first user equipment, a message regarding dropping of the first grant for sidelink transmission;
determine a misalignment between the first grant for sidelink transmission and respective active states of one or more second user equipments based, at least partially, on the received message, wherein the one or more second user equipments are configured to perform sidelink discontinuous reception; and
transmit, to the first user equipment, a second grant for sidelink transmission, wherein the second grant for sidelink transmission overlaps with at least one respective active state of the one or more second user equipments, wherein the second grant for sidelink transmission is at least partially different from the first grant for sidelink transmission.

11. The apparatus of claim 10, wherein the at least one memory and the computer program code are configured to, with the at least one processor, cause the apparatus to:
determine that the misalignment is based on at least one of:
an error in sidelink resource allocation,
an error in information, at the first user equipment, regarding at least one respective sidelink discontinuous reception configuration of the one or more second user equipments, or
an update of the at least one respective sidelink discontinuous reception configuration of the one or more second user equipments not received by the apparatus.

12. The apparatus of claim 11, wherein the misalignment is determined to be based, at least, on one of:
the error in the sidelink resource allocation, or
the update of the at least one respective sidelink discontinuous reception configuration of the one or more second user equipments not received by the apparatus,
wherein the at least one memory and the computer program code are configured to, with the at least one processor, cause the apparatus to at least one of:
determine the second grant for sidelink transmission based on available timing offset information associated with the at least one respective sidelink discontinuous reception configuration of the one or more second user equipments,
determine the second grant for sidelink transmission based on additional information regarding the first grant for sidelink transmission received after the message,
request that the first user equipment report a respective sidelink discontinuous reception configuration of the one or more second user equipments and determine the second grant for sidelink transmission based on the reported respective sidelink discontinuous reception configuration of the one or more second user equipments, or determine the second grant for sidelink transmission based on packet delay budget information.

13. The apparatus of claim 11, wherein the misalignment is determined to be based, at least, on one of:

the error in the information, at the first user equipment, regarding the at least one respective sidelink discontinuous reception configuration of the one or more second user equipments, or the update of the at least one respective sidelink discontinuous reception configuration of the one or more second user equipments not received by the apparatus;

and wherein the at least one memory and the computer program code are configured to, with the at least one processor, cause the apparatus to:

request discontinuous reception configuration information of at least one of the one or more second user equipments, from one of the first user equipment or the at least one second user equipment; and determine the second grant for sidelink transmission based on the requested discontinuous reception configuration information of the at least one second user equipment.

14. The apparatus of claim 10, wherein the at least one memory and the computer program code are configured to, with the at least one processor, cause the apparatus to:

transmit, to the first user equipment, a request to reconfigure sidelink discontinuous reception between the first user equipment and at least one of the one or more second user equipment.

15. The apparatus of claim 10, wherein the message regarding the first grant for sidelink transmission comprises at least one of:

an indication of a cause for dropping of the first grant for sidelink transmission, or an indication of information configured to enable avoidance of dropping of a grant for sidelink transmission.

16. The apparatus of claim 15, wherein the indication of the cause for the dropping of the first grant for sidelink transmission comprises one or more of:

an indication of whether the dropping of the first grant for sidelink transmission is due to a sidelink discontinuous reception conflict, an indication of whether the dropping of the first grant for sidelink transmission is due to one or more transmissions with a higher priority than a transmission to the one or more second user equipments, wherein the one or more transmissions conflict with the transmission to the one or more second user equipments, or a feedback sequence mapped to a type of the cause for the dropping of the first grant for sidelink transmission.

17. The apparatus of claim 15, wherein the information configured to enable avoidance of dropping of the grant for sidelink transmission comprises one or more of:

an indication of one or more next active states of the one or more second user equipments, a feedback sequence mapped to a timing offset range associated with at least one of the respective active states of the one or more second user equipments, a feedback sequence mapped to a range of a remaining packet delay budget of the first user equipment, or a feedback sequence mapped to an indication to wait for additional information to be received via a first signaling.

18. The apparatus of claim 17, wherein the first signaling comprises one of a sidelink buffer status report or a sidelink user equipment information report;

wherein the additional information to be received via the first signaling comprises an indication of at least one respective updated discontinuation reception active state information of the one or more second user equipments; and wherein the at least one memory and the computer program code are configured to, with the at least one processor, cause the apparatus to:

wait for the additional information based, at least partially, on the indication to wait for the additional information.

19. The apparatus of claim 10, wherein the at least one memory and the computer program code are configured to, with the at least one processor, cause the apparatus to:

request an update regarding the at least one of the respective active states of the one or more second user equipments based on at least one of:

receipt of the message, or a determination that a predetermined number of negative acknowledgements have been received from the first user equipment during a predefined time period.

20. The apparatus of claim 10, wherein the at least one memory and the computer program code are configured to, with the at least one processor, cause the apparatus to:

determine that there is not misalignment between respective grants for sidelink transmission for one or more third user equipments and the one or more second user equipments; and determine the second grant for sidelink transmission based, at least partially, on the determination that there is not misalignment between the respective grants for sidelink transmission for the one or more third user equipments and the one or more second user equipments.

* * * * *